March 9, 1926. 1,575,850
A. S. LIMPERT ET AL
SEALING DEVICE FOR REFRIGERATING APPARATUS
Original Filed April 21, 1923  2 Sheets-Sheet 1
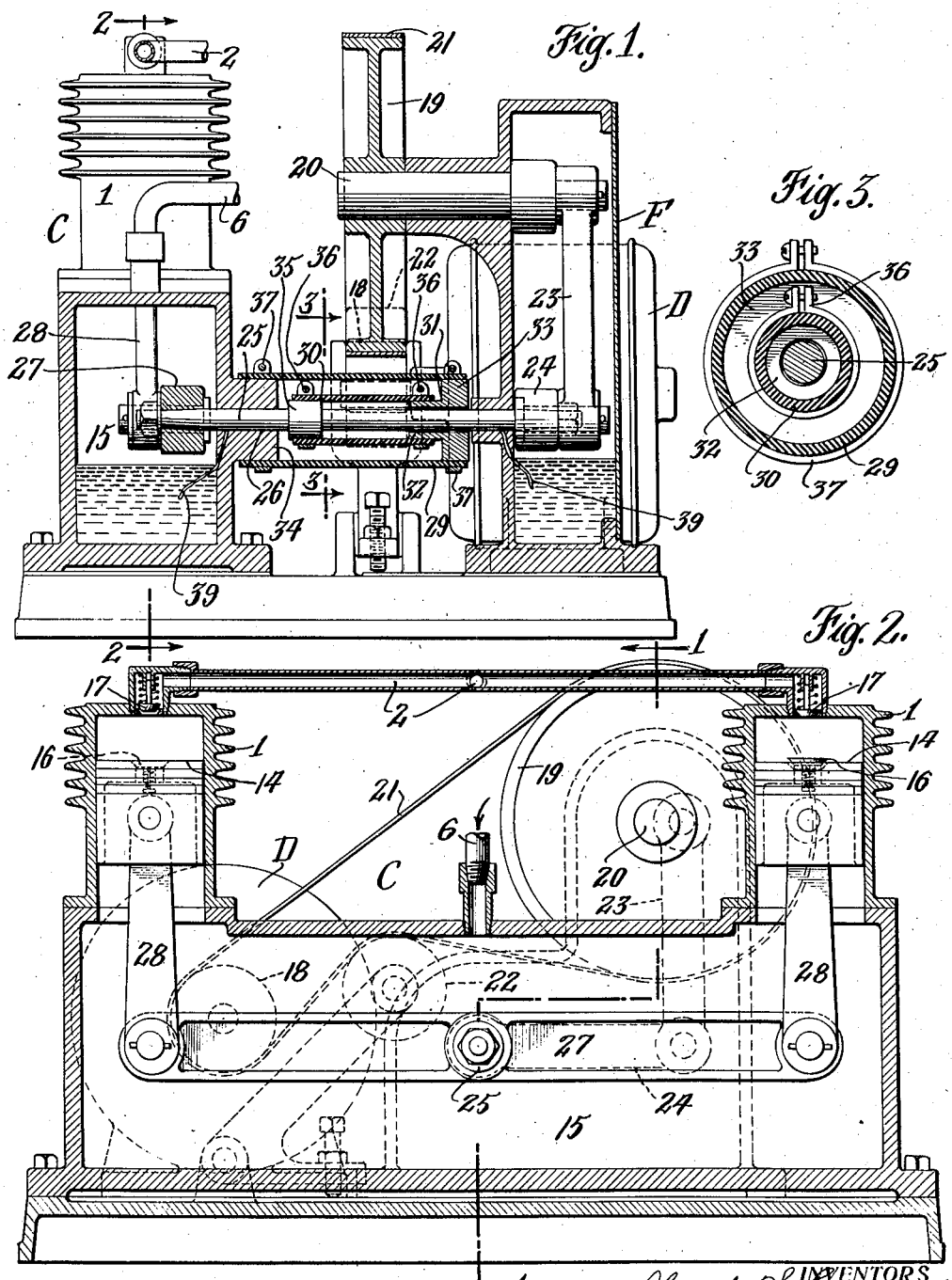

March 9, 1926.  1,575,850

A. S. LIMPERT ET AL

SEALING DEVICE FOR REFRIGERATING APPARATUS

Original Filed April 21, 1923    2 Sheets-Sheet 2

WITNESS.
Gustav Genzlinger.

INVENTORS
Alexander S. Limpert and
Sylvester A. Limpert
BY
Sylvester A. Wechner
ATTORNEYS Patented Mar. 9, 1926.

1,575,850

UNITED STATES PATENT OFFICE.

ALEXANDER S. LIMPERT AND SYLVESTER A. LIMPERT, OF BAY SHORE, NEW YORK, ASSIGNORS TO LIMPERT ICE MACHINE CORPORATION, OF NEW YORK, N. Y., A CORPORATION OF NEW YORK.

SEALING DEVICE FOR REFRIGERATING APPARATUS.

Application filed April 21, 1923, Serial No. 633,571. Renewed October 30, 1925.

*To all whom it may concern:*

Be it known that we, ALEXANDER S. LIMPERT and SYLVESTER A. LIMPERT, both citizens of the United States, residing at Bay Shore, in the county of Suffolk and State of New York, have invented certain new and useful Improvements in Sealing Devices for Refrigerating Apparatus, of which the following is a specification.

This invention relates to the so called mechanical refrigeration art and has for its object the provision of a greatly simplified apparatus of this character which can be relied upon to perform its function with the least possible annoyance, trouble and attention. We also propose to supply a machine which can be manufactured at a considerably less cost than has hitherto been possible and one which will be extremely economical to operate. In accomplishing the foregoing we provide a novel sealing mechanism for the compressor.

As is well known in this art the cold is produced by liquefying a gas such as ammonia or sulphur-dioxide and then allowing it to evaporate to absorb heat, the coil in which the expansion takes place being located generally in a brine tank. The refrigerant in nearly all cases is extremely volatile and highly objectionable if permitted to enter the air and for this reason it is very important that no leakage from the machine takes place. It is just as important that no leakage from the air into the machine takes place for much leakage in either direction would soon put the apparatus out of commission. A great many of the difficulties heretofore encountered in mechanical refrigeration have been associated with this question of leakage and by our invention we aim to completely overcome these difficulties and in so doing we obtain all of the objects above specified or hereinafter to be noted in connection with the description of our device.

Our improved sealing device comprises a twistable or flexible housing which surrounds the shaft utilized in driving the compressor. Such housing is tightly secured to the compressor and to the shaft so that it is impossible for any refrigerant to escape to the air or for any air to enter the system.

Figure 4:
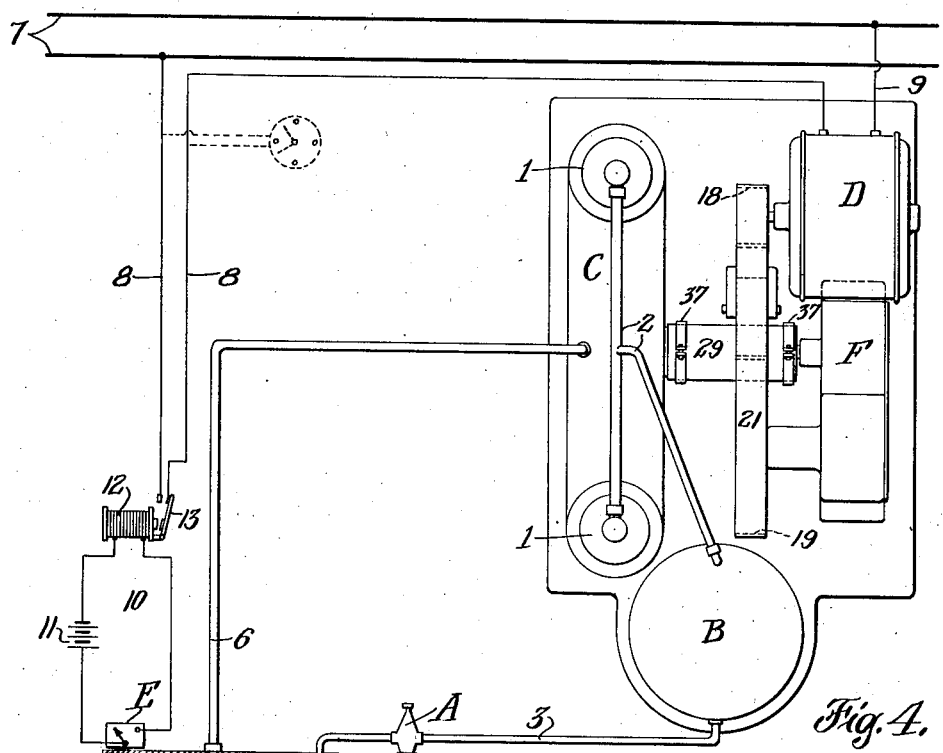
Figure 5:
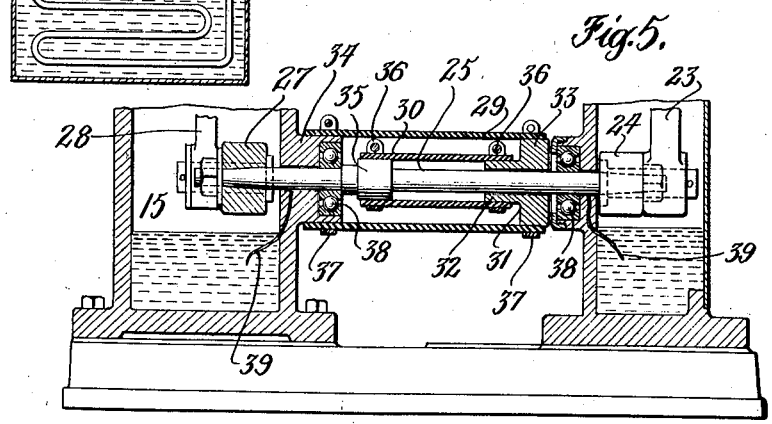

Fig. 1 is a vertical section through our improved apparatus taken on the line 1—1 of Fig. 2; Fig. 2 is another vertical section taken transversely of the section of Fig. 1 and on the line 2—2 of Fig. 1; Fig. 3 is an enlarged sectional view on the line 3—3 of Fig. 1 illustrating details of the sealing mechanism; Fig. 4 is a diagrammatical layout of an apparatus embodying our invention; and Fig. 5 is a partial section similar to that of Fig. 1 illustrating the use of ball bearings for the operating shaft.

Referring first to the diagrammatic layout of Fig. 4 it will be seen that we have therein illustrated a compressor C which we have provided with a pair of cylinders 1, preferably vertically disposed, which are arranged to deliver the compressed refrigerant through the pipe 2 to the condenser B. After the compressed gas has been condensed into a liquid it is conducted through the pipe 3 to any suitable type of pressure reducing valve A. After the pressure has been suitably reduced the liquid is permitted to vaporize in the coil 4 located in the brine tank 5. This produces cold in the manner well understood in this art. The expanded gases flow back to the compressor through the pipe 6. A motor D is used for operating the condenser through the medium of connections which will be described hereinafter. The motor is supplied with current from the mains 7 through the medium of wires 8 and 9, the former being under the control of the thermostatic pilot circuit 10. In the pilot circuit 10 the thermostat E closes the circuit from the battery 11 to the electromagnet 12 whenever the temperature in the brine tank falls below a certain predetermined point. The switch 13 will then be drawn over or to the left in order to close the break in the two branches of the wire 8 previously referred to. When this is accomplished the motor D is set in operation.

By referring to Fig. 2 it will be seen that there is a piston 14 in each of the cylinders 1. Uncondensed gas is taken from the base chamber 15 of the compressor C and passed up through the piston through the inlet valves 16. Compression of the gas then takes place after which discharge occurs through the exhaust valves 17. The device we have illustrated shows a pair of cylinders although it will be understood that a single cylinder could be used if desired or more could be used should occasion seem to demand or make advisable.

The motor D drives the compressor pistons through the medium of the driving pulley 18, the driven pulley 19 on the end of the shaft 20 and the belt 21. A suitably mounted idler pulley 22 can be used for adjusting the belt. Other forms of drive might be used but we have found this to be very satisfactory.

Instead of using the rotary motion of the motor directly we prefer to transform it into an oscillatory motion for reasons which will appear below in connection with the description of our improved sealing device. This transfer is accomplished in what we have termed our eccentric chamber F. The link 23 is mounted eccentrically on the end of the shaft 20 and as rotation of the shaft 20 takes place and up and down motion is imparted to the link 24 which is pivoted at one end to the link 23 and secured at the other end to the oscillating shaft 25. The oscillating shaft 25 extends into the base 15 of the compressor C in which it has a bearing 26. The motion of the shaft is imparted to the pistons through the medium of a rocking bar 27 and the links or piston rods 28. It will therefore be seen that as one piston is drawn downwardly the other piston is pushed upwardly. This makes a nicely balanced construction and we prefer the use of two cylinders instead of one.

The problem is to successfully seal the member or shaft which connects the compressor with the power means. Our improved sealing means for this purpose comprises an outer flexible or twistable housing 29 and an inner similarly characterized housing 30. A free floating ring or collar-like member 31 is placed on the shaft 25, such member being provided with two portions of different diameters, namely, a small diameter portion 32 and a large diameter portion 33.

The compressor casing is provided with a hub 34 surrounding the shaft 25 which is of a diameter substantially equal to the enlarged portion 33 of the ring or collar 31. At a point adjacent this hub the shaft 25 is provided with an enlargement or shoulder 35 of a diameter substantially equal to the diameter of the portion 32 of the ring 31. The collar or ring 31 is placed on the shaft with the smaller diameter portion projecting toward the shoulder 35 on the shaft, as clearly shown in Fig. 1.

The inside housing or hose is of a size to fit over the shoulder 35 and the portion 32 to which members its ends are securely clamped by means of the band clamps 36. The outside housing or hose 29 is of a size which fits over the hub 34 and the enlarged portion 33 to which members it is securely fastened by means of other band clamps 37. The joints between the ends of the housings and the members or parts to which they are secured are tight seals so that the tubes are connected together in a manner which forms a continuous unbroken enclosure from compressor to shaft, although the housing is composed of a plurality of sections joined together.

The flexible housing is preferably a stiff, high grade, rubber hose with substantial thickness of walls although other materials might be used.

It will be seen that with each oscillation of the shaft 25 the housing structure as a whole will be twisted slightly first in one direction and then in the other. By using only the highest quality of hose and by properly proportioning the length of the shaft 25 to the "twisting capacity," as it might be termed, of the hose, it is possible to run a device of this character for a great many months without giving it any attention whatsoever. Furthermore, the sectional, jointed character of the housing in itself lends considerable flexibility to the seal.

It will be seen that if any leakage occurs past the bearing 26 it can only enter the space between the two hoses. No leakage can possibly take place either from or into the compressor.

The power necessary to twist a housing of this character in the manner herein provided does not amount to anything at all comparatively speaking so that the machine will operate more economically by far than any machine wherein the old packing gland is used. The device is absolutely fool proof and will run indefinitely, as stated, without any attention whatsoever.

We realize that it has already been proposed to construct a sealing means of this character by the use of a single hose which is fastened at one end to the compressor casing and at the other end to the shaft. This construction however is open to a number of objections which the present invention overcomes. It will be readily understood, of course, that the degree of twist which a particular tube will stand depends first upon its composition and second upon its length. At first thought therefore it would seem that it would be necessary simply to provide sufficient length of tube in order to prevent straining at any time. This means however that the two main units of the machine, namely, the compressor unit and the power unit, would have to be separated a substantial distance which imposes certain awkwardness in design. Furthermore where a long tube is used a long shaft is necessary and the longer the shaft the greater must be its diameter in order to give it strength sufficient for its function. A long shaft in order to successfully resist the torsional "springing" must, in addition, be substantially greater in diameter than a short shaft.

By providing our improved construction involving the use of a large tube outside of a small one, we overcome the above objections. A marked advantage incident to our improvement is that we are enabled to use a much smaller bearing because of the smaller shaft which is of great importance when ball bearings 38 are used as illustrated in the modified construction of Fig. 5. As the size of ball bearings increases their cost mounts in an even greater ratio. Suitable wicks 39 may be provided for conveying oil from the base of the casing to the bearing.

By increasing the diameter of the shaft at the point where the smaller hose is connected, we avoid all possibility of chafing for it will be seen that if the hose were clamped directly to the shaft at a point of normal diameter there would be considerable friction between the hose and the shaft throughout the major portion of the length of the hose.

We wish to call attention to the fact that, where desirable, more than two housings might be used in constructing the seal. This would make use of more than one floating member but the principles involved and the general arrangement would be exactly the same.

We claim:

1. A sealing device for an oscillating refrigerant compressor shaft comprising in combination a plurality of flexible tubes, one within the other surrounding the shaft, one end of the outside tube being secured to the compressor, one end of the tube next to the shaft being secured to the shaft, and rigid means at the free ends of tubes for connecting them together to form a continuous enclosure from compressor to shaft.

2. A sealing device for a refrigerant compressor shaft comprising in combination a plurality of flexible tubes, one within the other surrounding the shaft, one end of the outside tube being secured to the compressor, one end of the tube next to the shaft being secured to the shaft, and a floating ring surrounding the shaft at the free ends of tubes to which corresponding ends of adjacent tubes are attached in order to form a continuous enclosure from compressor to shaft.

3. A sealing device for an oscillating refrigerant compressor shaft comprising in combination a pair of flexible housings, one within the other, surrounding the shaft, one end of the outer housing being secured to the compressor, one end of the inner housing being secured to the shaft, and rigid means at the other ends of the housings for coupling them together.

4. A sealing device for an oscillating refrigerant compressor shaft comprising in combination a flexible tube surrounding the shaft and secured at one end to the shaft, a larger flexible tube surrounding said first tube and secured at the corresponding end to the compressor, and a floating ring surrounding the shaft, the free ends of the tubes being secured to the ring.

5. A sealing device for an oscillating refrigerant compressor shaft comprising in combination; a shoulder on the shaft, a shoulder on the compressor, a floating ring surrounding the shaft having a portion of a diameter substantially equal to that of the shoulder on the shaft and another portion of a diameter substantially equal to that of the shoulder on the compressor, a flexible tube connecting the shoulder on the shaft with the corresponding portion of the ring, and a second flexible tube surrounding said first tube and connecting the shoulder on the compressor with the corresponding portion on the ring.

In testimony whereof, we have hereunto signed our names.

ALEXANDER S. LIMPERT.
SYLVESTER A. LIMPERT.